July 31, 1934.  A. O. BREDESON  1,968,368
PIPE COUPLING
Filed Dec. 7, 1931
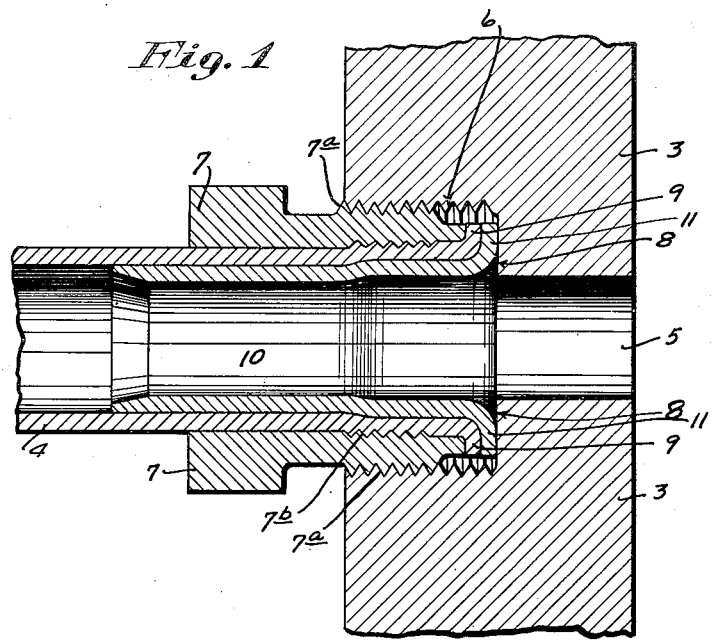
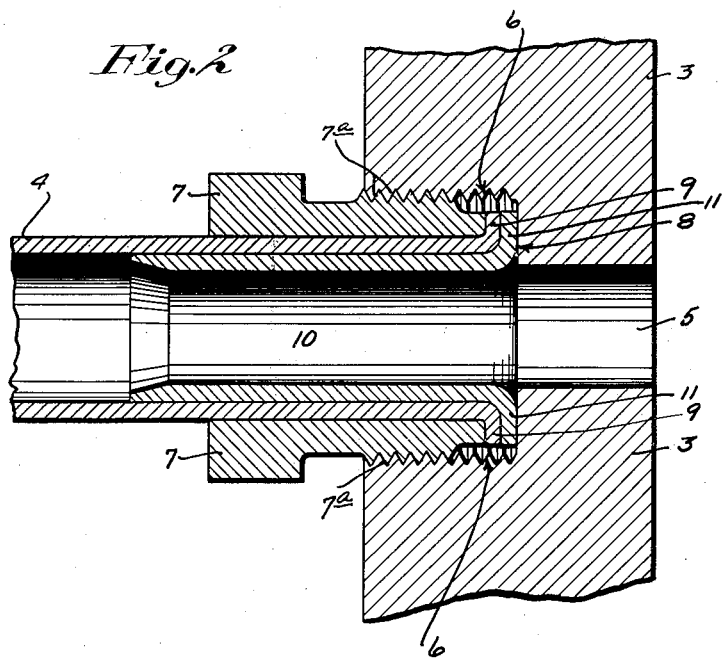
Inventor
ALBERT O. BREDESON
By his Attorneys
Merchant and Kiyon Patented July 31, 1934

1,968,368

UNITED STATES PATENT OFFICE 1,968,368

PIPE COUPLING

Albert O. Bredeson, Minneapolis, Minn., assignor to Super Radiator Corp., Minneapolis, Minn., a corporation of Minnesota Application December 7, 1931, Serial No. 579,454

2 Claims. (Cl. 285—48)

My invention provides an extremely simple and highly efficient detachable leak-proof pipe coupling or union for coupling pipes or tubes to solid bodies such as the walls of tanks or headers. Particularly, the coupling is designed for coupling copper or soft metal tubes to the headers or end tanks of heat exchange devices such as a hot water and steam radiator, but may be utilized generally in heat exchangers.

Generally stated, the invention consists of the novel construction, combination and arrangement of parts hereinafter described and defined in the claims.

In the accompanying drawing, which illustrates the invention, like characters indicate like parts throughout the several views.

Referring to the drawing:

Fig. 1 is an axial section with some parts broken away showing the improved coupling in its most highly efficient arrangement; and Fig. 2 is a view corresponding to Fig. 1, but illustrating the coupling in a somewhat simpler form than that illustrated in Fig. 1.

In the drawing, the numeral 3 indicates a wall of one of the headers or end tanks of a hot water or steam radiator, and the numeral 4 indicates one of the copper tubes of the radiator. The wall of the header 3 is formed with a water passage 5, the outer portion of which is enlarged and internally threaded at 6 to form a seat for a tubular lock nut 7 and to form a shoulder 8 at the inner extremity of the enlarged internally threaded cavity 6. The external threads of the nut 7 are indicated at 7ª.

The nut 7 is slidable on the exterior of the tube 4 and the end of said tube is turned outward to form an annular clamping flange 9 against which the inner end of the nut 7 engages.

Telescoped into the end of the tube 4 under tight driving engagement, is an internal reinforcing sleeve 10 which is preferably also of copper and at its outer end is bent or turned outward to form an annular clamping flange 11, that closely and directly engages the flange 9 of the tube. The inner end of the sleeve 10 is preferably internally bevelled or flared so as to form a thin edge that may be and is brought into very close contact with the interior of the tube, so as to form an exceedingly tight joint therewith and to form a very slight, if any, shoulder for the accumulation of sediment.

The description so far given applies equally to the structures of Figs. 1 and 2. In the simpler structure illustrated in Fig. 2, the exterior of the tube 4 up to its shoulder 9 is of constant diameter, and the interior of the nut 7 is smooth and of constant diameter. In the structure illustrated in Fig. 1, however, the nut 7 at its inner end portion is formed with internal threads 7ᵇ that are cut into the cylindrical inner surface of said nut so that these threads 7ᵇ do not project inward beyond the extended cylindrical internal surface of the nut and hence permit the nut to slide freely on the main body portion of the tube 4. In the structure of Fig. 1, however, the inner end portion of the reinforcing sleeve 10 and the inner end portion of the tube 4 are pressed slightly outward so that the exterior of the inner portion of the tube 4 will be engaged and cut into by the said threads 7ᵇ when the nut is screwed to position. It is also important to note that the threads 7ª and threads 7ᵇ should be not only in the same direction, but should have the same pitch and number per inch.

In both structures, the nut 7, when screwed into its limit, tightly compresses and clamps the flanges 9 and 11 together and between the shoulder 8 and the inner end of the nut. In the structure shown in Fig. 2, the tube 4 is anchored to the header of all three by the clamping of its flange 9 and by whatever slight friction there may be between the nut and the exterior of said tube. In the structure illustrated in Fig. 1, however, the tube 4 is anchored to the header wall not only by the clamping of its flange 9, but by the positive engagement of the threads 7ᵇ with the exterior of said tube.

The manner of applying the reinforcing sleeve 8 to the interior of the tube is important, for it protects the inner end of the tube from the contact with the water or vapor of the heating medium and affords a very rigid and strong connection between the tube and header wall.

From the foregoing it is evident that the coupling described is capable of modification within the scope of the invention described and claimed and is capable of a very wide range of use.

What I claim is:

1. A radiator tube having an out-turned end flange and a reinforcing sleeve telescoped into the end of said tube and having an out-turned flange engaging the end flange of said tube, in combination with an externally threaded nut mounted on the exterior of the tube with its outer end engageable with the out-turned flange of said tube, said nut having internal threads that are engageable with the end portion of said tube, the internal and external threads of said nut having the same pitch or number per inch and being in the same direction the end portion of said tube being slightly increased in diameter for engagement with the internal threads of said nut.

2. A radiator tube having an outturned annular end flange and a reinforcing sleeve telescoped within the end portion of said tube and having an outturned annular flange engaging the end flange of said tube, in combination with a plate having a passage with an enlarged internally threaded outer portion affording an annular clamping shoulder, and an externally threaded annular nut mounted on the exterior of said tube, having threaded engagement with the enlarged portion of said passage and when tightened serving to clamp the flanges of said tube and sleeve tightly together and against said annular shoulder, and the inner end of said nut.

ALBERT O. BREDESON.